(12) United States Patent
Weber et al.

(10) Patent No.: US 8,950,424 B2
(45) Date of Patent: Feb. 10, 2015

(54) DEVICE FOR TRANSPORTING SMALL VOLUMES OF A FLUID, IN PARTICULAR A MICROPUMP OR MICROVALVE

(75) Inventors: Lutz Weber, Zweibrücken (DE); Michel Neumeier, Mandelbachtal (DE)

(73) Assignee: Thinxxs Microtechnology AG, Zweibrücken (DE)

( * ) Notice: Subject to any disclaimer, the term of this patent is extended or adjusted under 35 U.S.C. 154(b) by 296 days.

(21) Appl. No.: 13/701,811

(22) PCT Filed: May 31, 2011

(86) PCT No.: PCT/DE2011/050017
§ 371 (c)(1),
(2), (4) Date: Jan. 23, 2013

(87) PCT Pub. No.: WO2012/019599
PCT Pub. Date: Feb. 16, 2012

(65) Prior Publication Data
US 2013/0118621 A1     May 16, 2013

(30) Foreign Application Priority Data

Jun. 2, 2010 (DE) .......................... 10 2010 022 550
Mar. 26, 2011 (DE) .......................... 10 2011 015 184

(51) Int. Cl.
| | |
|---|---|
| F16K 51/00 | (2006.01) |
| F17D 1/08 | (2006.01) |
| B01L 3/00 | (2006.01) |
| F04B 43/02 | (2006.01) |
| F04B 43/04 | (2006.01) |
| F16K 99/00 | (2006.01) |
| F17D 1/00 | (2006.01) |

(52) U.S. Cl.
CPC ............... *F17D 1/08* (2013.01); *B01L 3/50273* (2013.01); *B01L 3/502738* (2013.01); *F04B 43/021* (2013.01); *F04B 43/043* (2013.01); *F16K 99/0005* (2013.01); *F17D 1/00* (2013.01); *B01L 2300/0816* (2013.01); *B01L 2300/0887* (2013.01); *B01L 2400/0481* (2013.01); *B01L 2400/0638* (2013.01); *F16K 2099/008* (2013.01); *F16K 2099/0084* (2013.01)
USPC ........................ 137/315.01; 137/829; 137/833

(58) Field of Classification Search
USPC ............ 137/315.01, 315.05, 833, 829; 251/7, 251/331
See application file for complete search history.

(56) References Cited

U.S. PATENT DOCUMENTS

| | | |
|---|---|---|
| 5,593,290 A | 1/1997 | Greisch et al. |
| 6,068,751 A | 5/2000 | Neukermans |

(Continued)

FOREIGN PATENT DOCUMENTS

WO     2006020569 A     2/2006

*Primary Examiner* — Kevin Lee
(74) *Attorney, Agent, or Firm* — Lucas & Mercanti, LLP; Klaus P. Stoffel

(57) ABSTRACT

A microfluidic device for transporting a fluid, in particular a micropump or microvalve. The device has films, which lie against each other at film surfaces facing each other and are connected to each other in such a way that a transport channel to be formed between the films is defined, Deflecting apparatuses for forming the transport channel by jointly deflecting the films lie against each other in a direction perpendicular to the film surfaces. A deflecting surface region of the rear film in the deflection direction lies within the deflecting surface region of the front film in the deflection direction defined by the connection between the films.

19 Claims, 5 Drawing Sheets

(56) References Cited

U.S. PATENT DOCUMENTS

| | | |
|---|---|---|
| 6,179,586 B1 | 1/2001 | Herb et al. |
| 6,406,605 B1 * | 6/2002 | Moles .................... 204/601 |
| 6,899,137 B2 * | 5/2005 | Unger et al. ............. 137/833 |
| 7,832,429 B2 | 11/2010 | Young et al. |
| 8,337,777 B2 * | 12/2012 | Nurse et al. ............. 422/503 |
| 8,499,794 B2 * | 8/2013 | Takahashi et al. ........ 137/829 |
| 2005/0022888 A1 | 2/2005 | Samper et al. |
| 2006/0131529 A1 | 6/2006 | Cabuz et al. |
| 2007/0014676 A1 | 1/2007 | Cabuz et al. |
| 2008/0249510 A1 | 10/2008 | Mescher et al. |
| 2009/0217997 A1 * | 9/2009 | Feinerman ............... 137/833 |

* cited by examiner

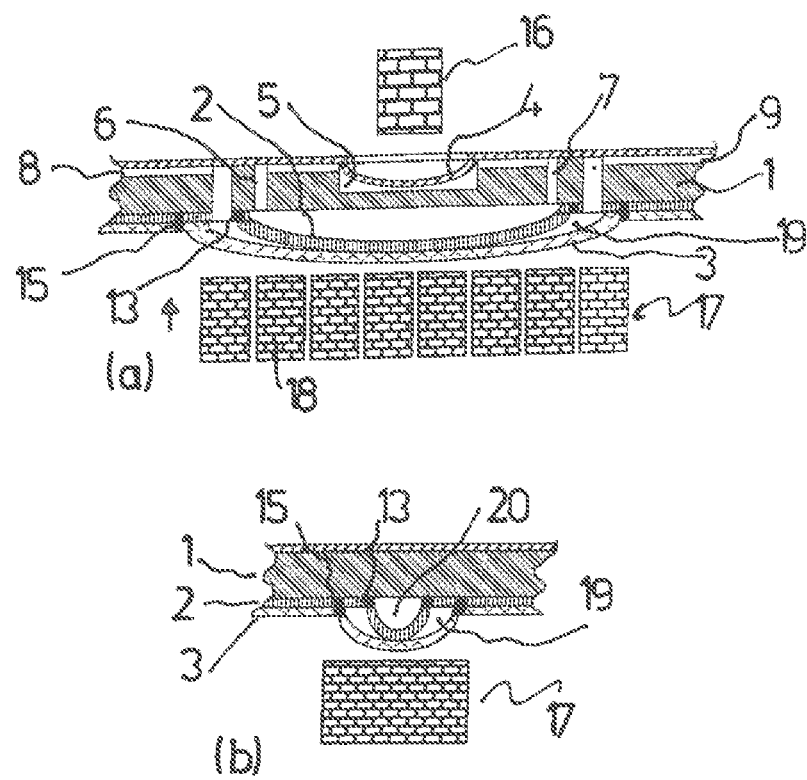
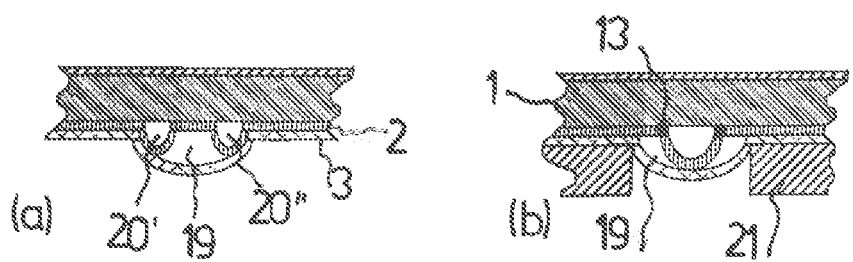
Fig. 4

DEVICE FOR TRANSPORTING SMALL VOLUMES OF A FLUID, IN PARTICULAR A MICROPUMP OR MICROVALVE

The present application is a 371 of International application PCT/DE2011/050017, filed May 31, 2011, which claims priority of DE 10 2010 022 550.9, filed Jun. 2, 2010 and DE 10 2011 015 184.2, filed Mar. 26, 2011, the priority of these applications is hereby claimed and these applications are incorporated herein by reference.

BACKGROUND OF THE INVENTION

The invention relates to a device for transporting small volumes of a fluid, particularly a micropump or a microvalve.

SUMMARY OF THE INVENTION

Accordingly, the invention relates to the field of microfluidics, which is increasingly gaining significance in medicine and other biological sciences. Miniaturized devices for the analysis and/or material synthesis accommodated on a chip are increasingly used in diagnostics as well as in therapy. In particular, micropumps play an increasing role in medicament dosing.

The transport device mentioned above can be considered to be used as a separate device or as a component of a microfluidic analysis or/and synthesis device comprising additional components, particularly a so-called flow cell.

When manufacturing microfluidic flow cells, the methods as well as materials of semiconductor technology are used, i.e. materials such as glass, quartz or silicon. In the desire to lower the costs for the manufacturing of microfluidic products, synthetic materials are used more frequently as less expensive materials. With respect to achieving a mass production which is economical but still meets high precision requirements, this gives rise to a multitude of specific problems, which in many cases prevent further reduction of the costs and the manufacture of synthetic microfluidic chips as disposable products.

U.S. Pat. No. 7,832,429 B2 discloses a transporting device in the form of a micropump which includes a stiff plastic substrate and a film which rests against the substrate and is of the same synthetic material. The film which is partially connected to the substrate and partially rests against the substrate may be lifted from the substrate by negative pressure while forming a cavity, or a plurality of cavities which are connected to each other by means of permanent connecting ducts. A pumping effect can be achieved by sequentially forming the cavities.

Such transporting devices are preferably used in disposable microfluidic flow cells for analysis and synthesis, and for transporting small fluid quantities in the range of 0.001 ml to 10 ml in medical diagnostics, medicament dosing, cell cultivation, bioreactors, and agent development and micro-reaction technology.

The present invention is based on the object of creating a novel transporting device of the above described type which makes possible, while further improving the properties of the device, an economical mass production and, beyond that, simple, preferably mechanical and leakage-free points of intersection with an operating device.

The device according to the invention, which meets this object, is characterized by films which rest against each other with oppositely located film surfaces and are connected to each other by limiting a transport duct formed between the films, as well as by means of common deflection of the films which rest against each other in a direction perpendicular to the film surfaces, wherein a deflectable surface area of the rear film in the direction of deflection is located within the deflectable surface area of the front film in the direction of deflection, defined by the connection between the films.

In accordance with the invention, the transporting duct between the films which are connected to each other is formed only by actuating, i.e. deflecting the two films. Advantageously, this type of duct formation does not require a soft elastic film material which contains, for example, softeners and other substances, such as oils, and which would not be compatible with a large number of substances to be transported by the transporting duct. Possible materials for both films are PMMA, PS, COP, COC, PP, PC, PE, or PEEK. When the actuation is canceled, the transporting duct is formed back, for example, automatically. However, this forming back can also take place by a second actuation which counteracts the formation of the transporting duct.

While it would be conceivable to enclose the films for their connection in an operating device comprising clamping jaws and suction devices, the films are preferably connected inseparably to each other by mutual adherence of the film surfaces which rest against each other, particularly by welding. The tightness of the transporting duct can thus be ensured even at a high pressure of the fluid to be transported.

While the inseparably connected films could also be clamped in an operating device, wherein one of the clamping jaws would have to provide a suction function, in a preferred embodiment of the invention at least the rear film in the direction of the deflection is inseparably connected to a rigid substrate. This rigid substrate may preferably include, as is conventional in microfluidic flow cells, ducts, reservoirs, filters, or mixing and reaction chambers, or detection chambers, as well as fluidic inlets and, if applicable, outlets for introducing and/or removing samples which are connected to each other in series and/or parallel individually or jointly by the transporting device according to the invention.

Moreover, the front film in the direction of the deflection could be held by a clamping device. However, preferably the front film in the direction of deflection is inseparably connected, possibly through the rear film, to the substrate.

In accordance with an especially preferred further development of the invention, the deflectable surface area of the rear film in the direction of deflection is defined by the area of connection of this film with the substrate, particularly a welding seam connecting the film to the substrate. The deflectable surface area of the rear film rests in a loose but planar manner within the preferably enclosed circumferential welding seam against the substrate.

While it would be conceivable to use a clamping device for forming the limitation of the deflection surface area in the particularly preferred embodiment of the invention, also when connecting the front film to the rear film, the deflectable surface area of the front film in the direction of deflection is limited by a connecting area with the rear film, particularly a welding seam connecting the front film to the rear film. The preferably circumferentially enclosed welding seam of the rear film thus also includes the welding seam of the front film.

In accordance with another advantageous further development of the invention, the latter welding seam connecting the two films is a double welding seam for connecting the rear film to the substrate, preferably by laser welding.

Preferably, the two films consist of the same synthetic material, wherein this material additionally also may be the same as the material of the substrate. Advantageously, in this manner, a fluid to be transported comes into contact with only one and the same material.

Advantageously, the deflection device is provided for applying a pneumatic, hydraulic or/and mechanical pressure against the deflectable surface area of the rear film in the direction of deflection.

Correspondingly, a pressure duct for a pressurized gas or a pressurized liquid can open into the surface area of the substrate which is located opposite the deflectable surface area of the rear film. Alternatively, a throughopening for the passage of an actor ends at this location.

In accordance with another preferred embodiment of the invention, at least one duct opens into the surface area of the substrate which is located opposite the difference range of the deflectable surface areas of the front and rear films.

As a rule, the adhesive connection area between the films defining the transporting duct will be closed circumferentially between the films. Alternatively, it may include an opening, for example, for the entry of a liquid which will then enter the transporting duct as a result of capillary force.

In the latter case, the interior of the transporting duct is advantageously conditioned hydrophilically.

In accordance with another advantageous further development of the invention, devices for determining the degree of deflection of the front film or the interior volume of the transporting duct may be provided. The internal volume may vary, for example, if the pressure of a fluid to be transported varies. By measuring the respective size of the formed internal volume, the flow quantity can be kept constant by an appropriate control of the pump actuator movement. Any variations of the internal volume of the transporting duct which may occur as a result of pressure variations of the fluid to be transported, can advantageously be minimized by mounting an additional film for creating a pressure-controlled external space for the transporting area to which pressure can be applied separately and in a controlled manner.

An actuation device acting on the transporting duct is preferably provided for producing a closing front advancing in the transporting direction. The closing front pushes, in a peristaltic pumping movement, fluid which has entered the transporting duct and transports the fluid in the desired manner with the speed of the advancing closing front out of the transporting duct. The actuating device closes the transporting duct, if applicable, against the force applied for deflecting the films. Closing of the transporting duct is effected by placing the films flat against each other.

The transporting duct may have, on the entry side, several entry ducts for fluids to be mixed which are connected to several ducts or reservoirs for the various fluids. The actuator movement results, in addition to transporting the fluids, to simultaneously mixing of the fluids.

The invention will be described in the following with the aid of embodiments and the enclosed drawings referring thereto. In the drawing:

BRIEF DESCRIPTION OF THE DRAWING

FIG. 3 is a longitudinal sectional view of the micropump of FIG. 1,

FIG. 4 shows various possibilities for forming a transport duct according to the invention.

DETAILED DESCRIPTION OF THE INVENTION

Figure 1:
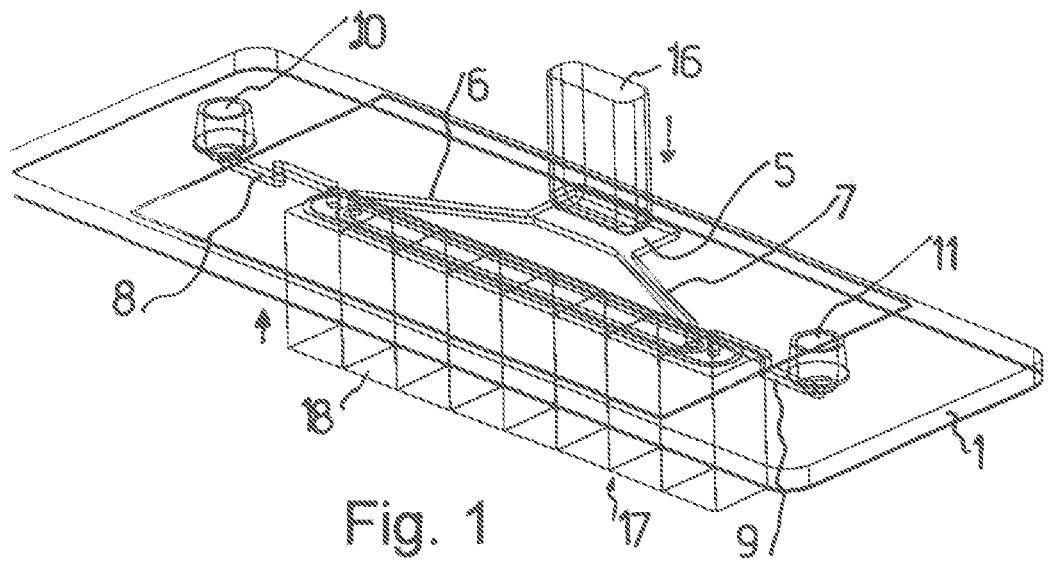
FIG. 1 shows a micropump according to the invention in a perspective view.

A structural micropump group illustrated in FIGS. 1 to 4 comprises a substrate 1 in the form of a flat plate, a film 2 connected to the plate side of the substrate 1, and another film 3 connected to the substrate 1 through the film 2. On its side facing away from the films 2 and 3, the substrate 1 is connected to a third film 4.

In the illustrated embodiment, all of the mentioned components are of the same synthetic material. To be considered in this connection are, for example, PMMA, PC, PS, PP, PE, COC, COP, PET or PEEK.

The thickness of the substrate 1 may be, for example, between 0.5 mm and 5 mm, in particular between 0.5 mm and 2 mm. The thickness of the film 2 is preferably in the range of 0.001 mm to 0.5 mm, particularly 0.01 mm to 0.1 mm and the thickness of the film 3 is, for example, 0.01 mm to 1 mm, preferably 0.05 mm to 0.3 mm.

While the films 2 and 3 extend in the illustrated embodiment beyond the entire plate surface of the substrate 1, the film 4 only covers a partial area of the respective plate surface and closes, in particular, a recess 5 formed in the substrate 1 and partially up to the ducts 6 and 7 or 8 and 9 leading to the connections 10 and 11.

Figure 2:
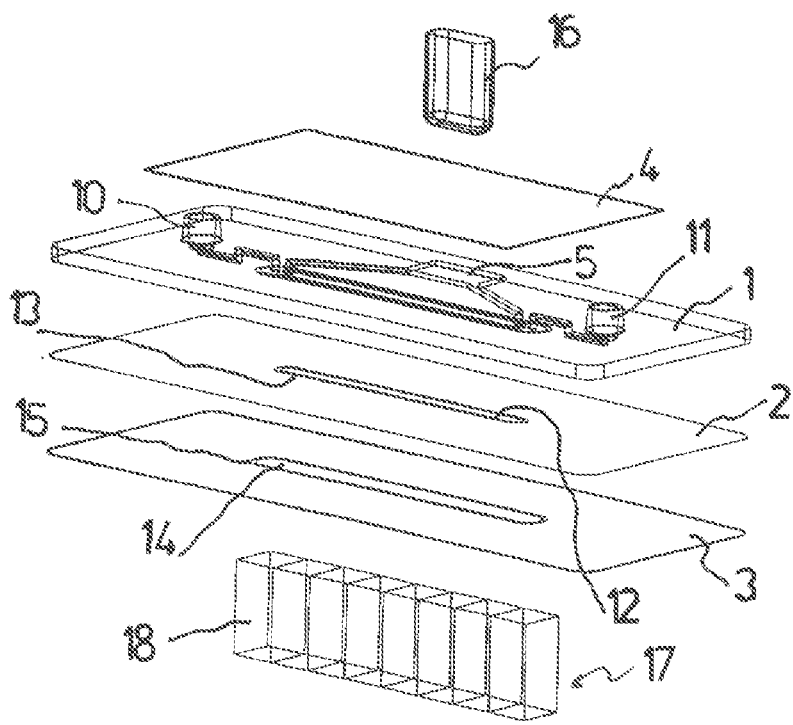
FIG. 2 shows the micropump of FIG. 1 in an exploded view.

As can be seen particularly in FIG. 2, the film 2 has an oblong surface area 12 which is defined by a welding seam 13 connecting the film 2 to the substrate 1, preferably by means of a welding seam 13 produced by a laser. Preferably, for carrying out the laser welding, the film 2 is constructed so as to be transparent at least in the area of the welding seam 13 for the selected laser wave length, and the area of the substrate 1 located underneath the welding seam 13 is constructed so as to be absorbent, for example, by adding additional absorbing materials, such as carbon or soot, to the synthetic material. Within the surface area 12 and outside of the welding seam, the film 2 rests loosely against the substrate 1.

The film 3 has a surface area 14 which is similar to the surface area 12 but has a larger size which includes the surface area 12, and a welding seam 15 which, as in the case of the welding seam 13, is preferably formed by laser welding. The welding seam 15 connects as a double seam the film 3 to the film 2 as well as the film 2 to the substrate 1.

Reference numeral 16 refers to a mechanical actor which is a component of an operating device for the structural micropump group comprising the substrate 1 and the films 2 to 4 and which is capable of deflecting the film 4 into the recess 5 in the substrate 1.

On the side of the structural micropump group facing away from the actor 16, an actor device 17 is arranged which extends over the length of the entire surface area 14 and comprises actors 18 which are movable individually perpendicular to the plane of the plate of the substrate 1.

The manner of operation of the above described structural micropump group will be described in the following with the aid of FIG. 3 whose FIG. 3a shows a longitudinal sectional view along the middle of the surface area 12, 14 and whose FIG. 3*b* shows a cross sectional view through these surface areas.

An elongation of the film 4 by the actor 16 into the recess 5 leads to a displacement of the fluid contained in the recess 5, for example, air, into the ducts 6 and 7 which open into the substrate 1 opposite the surface area 12 of the film 2, resting against the substrate 1. The fluid emerging from the openings, which may possibly be compressed, expands the film 2 which, up to then, has been resting flat against the substrate 1 in the manner illustrated in FIG. 3 with the formation of a deflection duct 20. This elongation inevitably also causes an elongation of the film 3, which up to then has been resting flat against the film 2. Because of the greater elongation of the surface 14 of the film 3 as compared to the surface area 12 of the film 2, during this elongation a transporting duct 19 is formed between the films 2, 3 into which the ducts 8 and 9 open at the ends thereof.

If, for example, the connection 10 forms an inlet for the fluid to be transported by the structural pump group, the waiting fluid is suctioned through the duct 8 into the transporting duct 19 as a result of the creation of the transporting duct 19.

A progressing closing front, caused by the successive actuation of the actors 18 of the actuating device 17, pushes the fluid which has been suctioned into the transporting duct 19 through the duct 9 to the connection 11 serving as an outlet. While fluid is being pushed out, new fluid to be transported can be suctioned already behind the closing front, so that in a peristaltic pump movement fluid can be continuously transported. Typical flow rates are between 0.1 μl/min and 10,000 μl/min.

It is understood that the above described structural pump group may also be capable of transporting from the connection 11 to the connection 10 in the reverse direction.

The structural pump group could be a component of a larger flow cell which carries out a large number of additional functions. The inlet and the outlet could coincide and a fluid transport could take place in a circular motion. Reservoirs could be provided instead of the connections 10 and 11.

FIG. 4 shows another possibility for forming a transporting duct 19 between the films 2 and 3 by means of a deflection duct to which a pressurized fluid is admitted.

In accordance with FIG. 4*a*, an arrangement with two deflection ducts 20' and 20" is provided. Welding seams are omitted in FIG. 4*a*.

FIG. 4*b* shows an embodiment with a symmetrical deflection duct 20 in which only the film 2 is permanently connected to the substrate 1 through a welding seam 13. A pressing device 21, which preferably is a component of an operating device, serves for connecting the films 2, 3 to each other and for limiting the transporting duct 19.

The position, number and width of the deflection duct or ducts, as well as the stiffness of the films, determine the cross section and the volume of the transporting duct 19.

Figure 5:
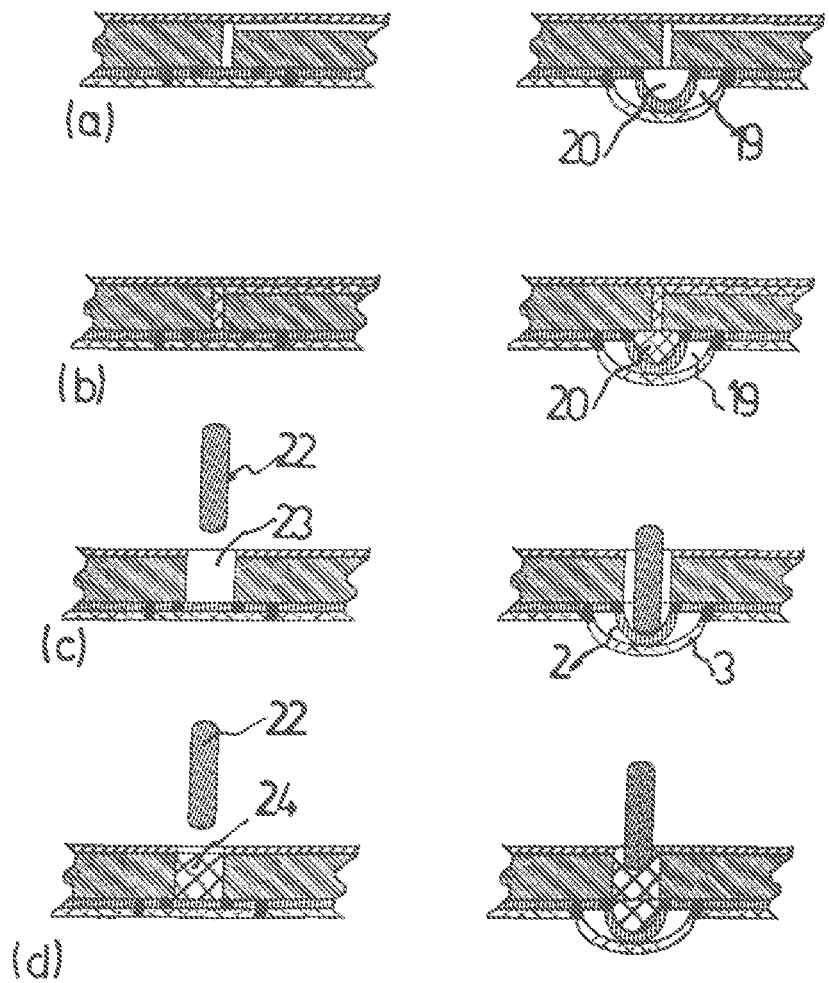
FIG. 5 shows various possibilities for deflecting films in accordance with the invention.

FIG. 5 explains different possibilities for film deflection.

FIGS. 5*a* and 5*b* illustrate the possibility, already discussed above, for the pneumatic and hydraulic pressure application to a deflecting duct 20.

FIG. 5*c* explains the possibilities for deflecting the films 2, 3 by means of a mechanical element 22 which engages in a throughopening 23 in the substrate 1. It may be advantageous in this connection if the mechanical element 22 is heated. By the equalization of the shapes of the element 22 and the film 2, as well as the equalization between the film 2 and the film 3, the heat can be transmitted very well to the fluid contained in the transporting duct, which is in particular advantageous for temperature changing cycles, as it is advantageous in the amplification of DNA by means of PCR, so that the transporting device for carrying out PCR and similar processes in microfluidic flow cells. For carrying out temperature exchange cycles, either the temperature of an element 22 can be actively varied or different elements 22 with constant temperatures can be connected with positive engagement successively to the film 3.

In accordance with FIG. 5*d*, in the passage opening, a plastically or elastically deformable filling 24 is provided, which transmits the movement of the mechanical element 22, wherein the filling 24 is composed of a silicon or thermoplastic elastomer.

The suitable stiffness of the deflecting film and the manner in which the deflection can take place make it possible to control the force necessary for the pump actors.

Figure 6:
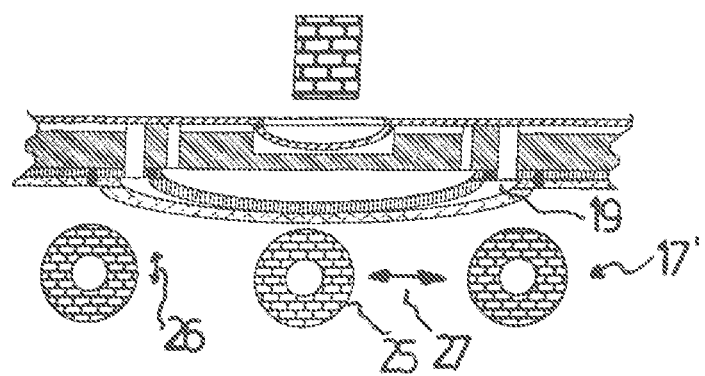
FIG. 6 shows another embodiment of a pump for a structural pump group according to the invention.
Figure 7:
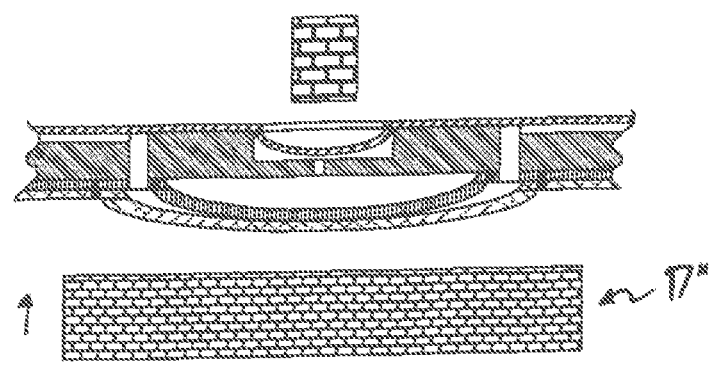
FIG. 7 shows an embodiment of a structural valve group according to the invention.

FIGS. 6 and 7 show further embodiments for actor devices.

An actor device 17' according to FIG. 6 has, instead of actors which are only capable of translatory movement, rollers 25 which carry out a rolling movement in accordance with arrow 27 in addition to a translatory movement according to arrow 26, and which can transport a fluid by displacing a closing front in the transporting duct 19.

An actor device 17" illustrated in FIG. 7 closes the transporting duct 19 over its entire length. Accordingly, the arrangement of FIG. 7 has the function of a valve.

Figure 8:
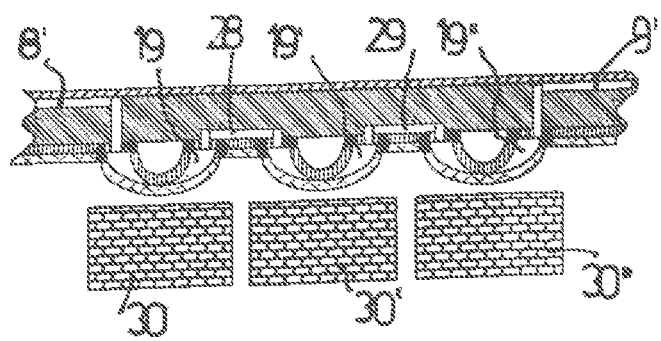
FIG. 8 shows a multiple chamber pump according to the invention.

FIG. 8 shows an embodiment of a structural pump group with three successively arranged chambers or transporting ducts 19', 19", 19"', which are connected to each other through overflow ducts 28 and 29. An actor 30, 30' and 30" is assigned to each of the transporting ducts 19', 19" and 19"'. By successively actuating the actors, a fluid can be transported from an inlet duct 8 to an outlet duct 9 or vice-versa.

The volume of the transporting duct 19 formed by deflection of the films 2, 3 may also depend, through the extent of the deflection of the film 3 beyond the film 2, on the input pressure of the fluid to be transported. In order to be able to take into consideration volumes of the transporting duct of different sizes during the fluid transport, it is essential to know the respective size of the transporting duct.

Figure 9:
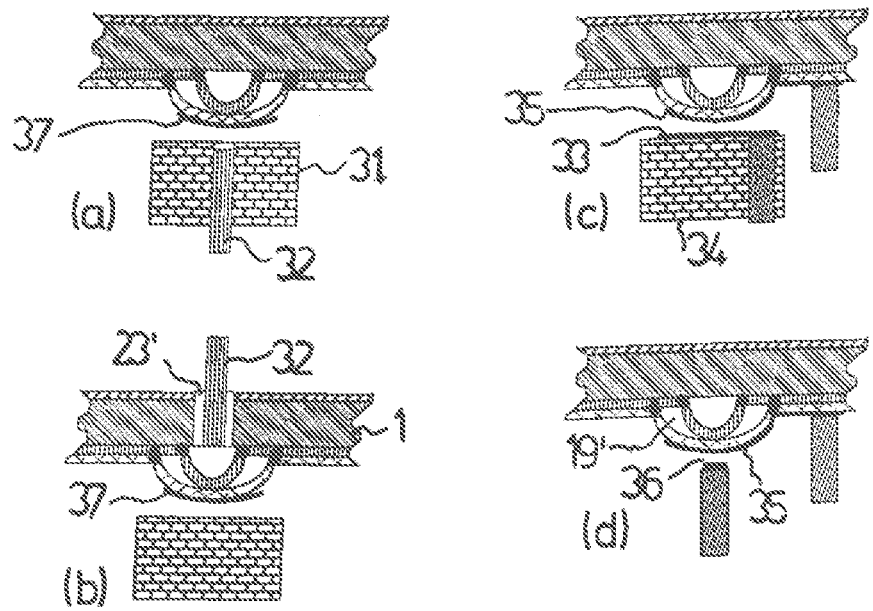
FIG. 9 shows various possibilities for determining the internal volume of a transporting duct constructed according to the invention.

FIG. 9 shows various possibilities for measuring the deflection, or the magnitude of the volume of the transporting duct. In particular in applications in which the input pressure of a fluid to be transported is variable, for example, in the field of medicament dosing, it may be necessary to control the deflection of the films in order to be thereby able to control the flow through the pump, for example, by adjusting the pump frequency.

FIG. 9*a* shows an actor 31 with a light conductor 32. The light conductor 32 sends light to a reflecting surface 37 on the film 3 in the transporting duct 19 and receives reflected light whose intensity depends on the respective elongation of the film 3 and the position 31 of the actor. From the light measurement in connection with a determination of the position of the actor, it is possible to determine the elongation of the film, and thus, the inner volume of the transporting duct.

In accordance with FIG. 9*b*, the light emitting and receiving light conductor 32 is not a component of the actor, but is arranged in a throughopening 23 in the substrate 1.

In accordance with FIG. 9*c*, the measurement of the capacity of an electrode 33 on an actor 34, and an electrode 35 on the film 3, takes place in the area of the transporting duct 19. The same configuration could be used for carrying out the measurement of the deflection of the film 3 by means of a conductivity measurement. In that case, the electrode 35 is preferably constructed as a conductive strip, for example, in the form of a strip shaped electrically conductive, especially metal, coating or imprint parallel to the longitudinal axis in the transporting direction of the duct 19. Preferably, as illustrated in FIG. 9c, it is not necessary to separately contact the metal coating. According to FIG. 9c, at least two of the actors 18, 34 are each equipped with an electrode 33, wherein the electrodes are electrically connected through an evaluating circuit. If one of the at least two actors is in the non-actuated state and the other is in the actuated state, the electrode 35 is contacted by the second actor, but not by the first. Correspondingly, current cannot flow between the two electrodes 33. When actuating/moving the second actor, this second actor comes into contact, when contacting the film 3, with the electrode 35 located on the film 3, and current can flow between the electrodes 33 of the two actors. The time or the distance which the first actor requires from its initial position until contacting the film 3 is therefore a measure for the degree of deflection under pressure of the film 3 and can be utilized for carrying out the control. In the same manner, a configuration of several electrodes at a defined distance along the width of the transporting duct could be used, wherein the number of electrodes which are short circuited in accordance with the above described principle provides the information concerning the degree of the deflection of the film 3 caused by pressurization.

FIG. 9d shows a measuring transporting duct 19' with an electrode 35 which is only used for measuring purposes and is not subjected to pumping action. The measurement of the deflection of the film 3 takes place capacitively between the electrode 35 and a further electrode 36.

Also possible is the use of eddy current sensors for measuring the deflection of the film 3.

Figure 10:
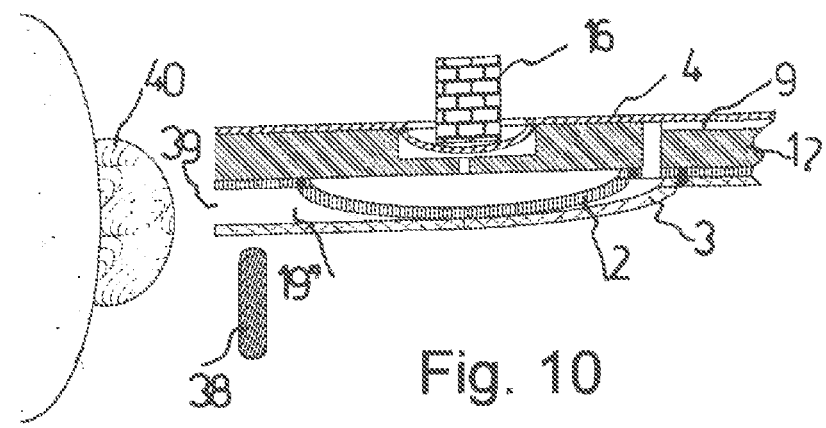
FIG. 10 shows a structural pump group based on capillary action according to the invention.

FIG. 10 shows a structural group, with a substrate 1 and films 2, 3 and 4, which differ from the structural pump group according to FIGS. 1 to 4 in that a transporting duct 19", to be formed between the film 2 and the film 3, is open at one end because a connection between the films is not present. At the other end, the transporting duct is in connection with a further duct 9.

The transporting duct 19" is hydrophilically conditioned for filling by capillary action by providing internal surface modifications or coatings, for example, by wet chemical treatment, corona treatment, plasma treatment or polymerization.

By actuating an actor 16, the transporting duct 19" is formed and a liquid sample 40, for example, a drop of blood on the skin of a finger, enters at the open end into the transporting duct 19" by capillary action. The inlet opening of the further duct 9 in this case, forms a capillary stop. After filling, the transporting duct 19" is closed at the open end by means of an actor 38 and the actor 16 is then taken back. The films 2, 3 then again rest flat against the substrate 1 by ejecting the liquid sample which had been taken into the further duct 9.

Figure 11:
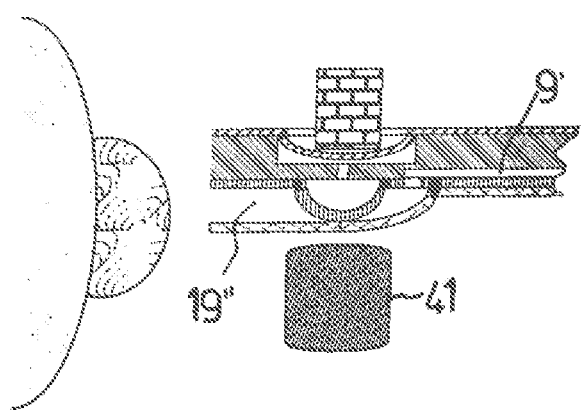
FIG. 11 shows a structural valve group according to the invention based on capillary action.

According to FIG. 11, a further duct 9' is also hydrophilically conditioned so that the mentioned capillary stop action is eliminated and a liquid sample enters also the further duct 9' through the transporting duct 19". An actor 39 closes the filled duct 9'. The device according to FIG. 11 thereby acts as a valve.

The actors 16, 38 and 41 can be part of an operating device or part of a housing component of a disposable flow cell, wherein the housing component may be movable or slidable relative to the flow cell.

The invention claimed is:

1. A microfluidic device for transporting a fluid, comprising films that rest against each other with film surfaces which face each other and are connected to each other so as to define a transporting duct to be formed between the films; and deflecting devices for forming the transporting duct by jointly deflecting the adjacent films in a direction perpendicular to the film surfaces, wherein a deflectable surface area of a rear film in the deflecting direction is located within a deflectable surface area of a front film in the deflecting direction, defined by the connection between the films.

2. The device according to claim 1, wherein the films are inseparably connected to each other by mutual adherence of the film surfaces resting against each other.

3. The device according to claim 2, wherein the films are connected by welding or gluing.

4. The device according to claim 1, wherein at least the rear film in the deflecting direction is connected inseparably to a rigid substrate.

5. The device according to claim 4, wherein the deflectable surface area of the rear film in the deflecting direction is defined by a connecting area of the rear film with the substrate.

6. The device according to claim 5, wherein the deflectable surface area of the front film is bordered by a welding seam which connects the film to the substrate.

7. The device according to claim 2, wherein that the deflectable surface area of the front film in the deflecting direction is defined by a connecting area with the rear film in the deflecting direction.

8. The device according to claim 7, wherein the deflectable surface area of the front film is bordered by a welding seam connecting the front film to the rear film.

9. The device according to claim 8, wherein the welding seam connecting the films is a double welding seam for connecting the rear film to the substrate.

10. The device according to claim 1, wherein at least the two films are of a same material.

11. The device according to claim 1, wherein the two films are of a same synthetic material.

12. The device according to claim 1, wherein the deflecting devices are for exerting pneumatic, hydraulic or/and mechanical pressure and are provided on the deflectable surface area of the rear film in the deflecting direction.

13. The device according to claim 4, wherein, in a surface area of the substrate, which is located opposite the deflectable surface area of the rear film in the deflecting direction, a pressure duct or a passage opening opens for the passage of an actor, wherein the actor is heatable by carrying out an amplification reaction.

14. The device according to claim 4, wherein in a surface area of the substrate, which is located opposite a difference area of the deflectable surface areas of the front and rear films, at least one duct opens which is connectable to a fluidic connection, reservoir, or other processing device formed in the substrate.

15. The device according to claim 1, wherein for forming the transport duct, the rear film in the deflecting direction has several deflectable surface areas.

16. The device according to claim 2, wherein a adhesive connection area defining the transporting duct is circumferentially closed between the films, or has an opening.

17. The device according to claim 16, wherein the transporting duct has an inside that is hydrophilically conditioned.

18. The device according to claim 1, further comprising devices for determining a degree of deflection of the front film or an inner volume of the transporting duct.

19. The device according to claim 1, further comprising an actor device that acts on the transporting duct so as to partially or completely close the transporting duct.

* * * * *